J. N. DANIEL.
COTTON CHOPPER.
APPLICATION FILED JAN. 12, 1917.

1,231,502.

Patented June 26, 1917.
4 SHEETS—SHEET 1.

Witness
E. Q. Ruppert.

Inventor
J. N. Daniel
By Victor J. Evans
Attorney

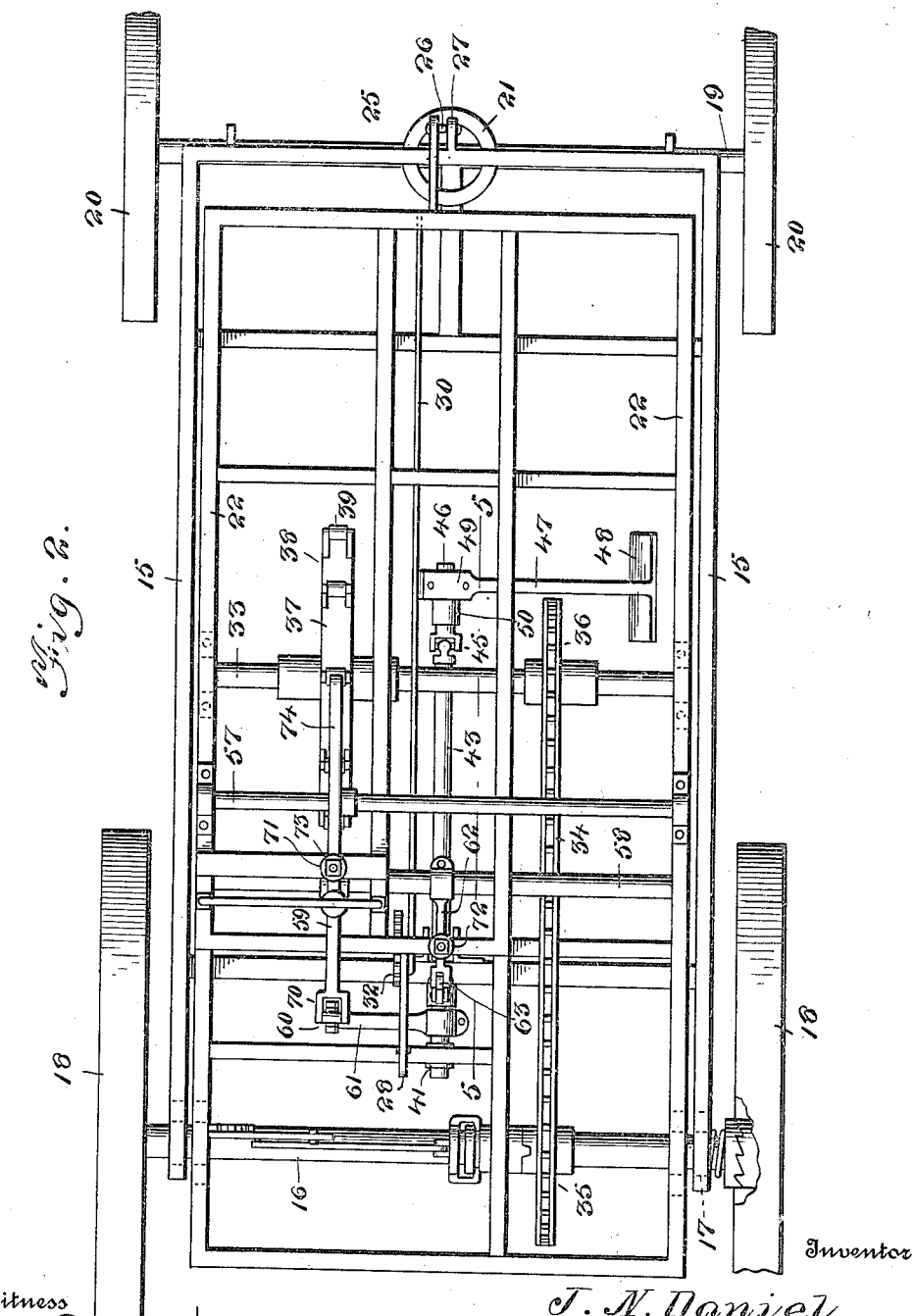

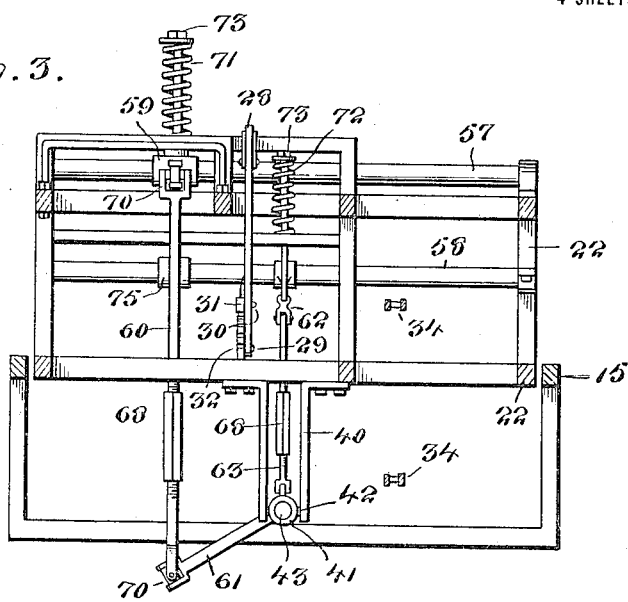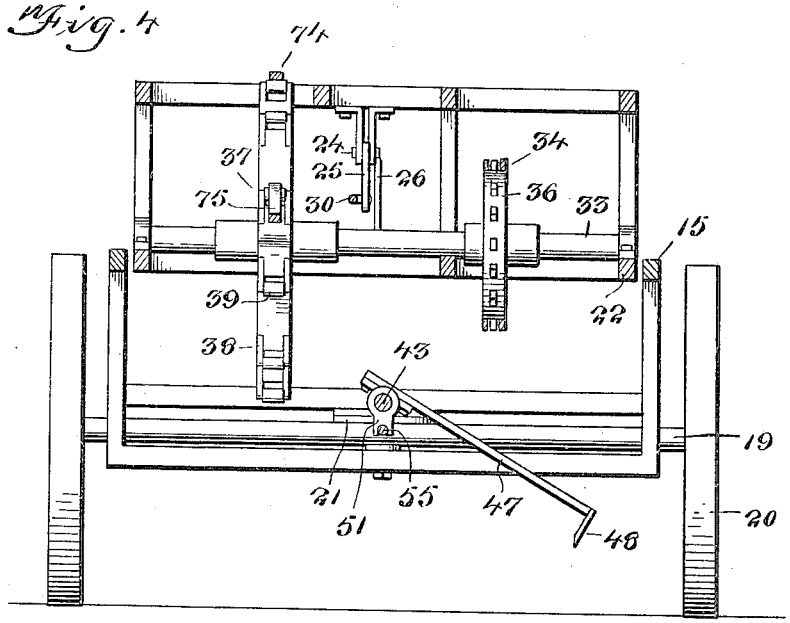

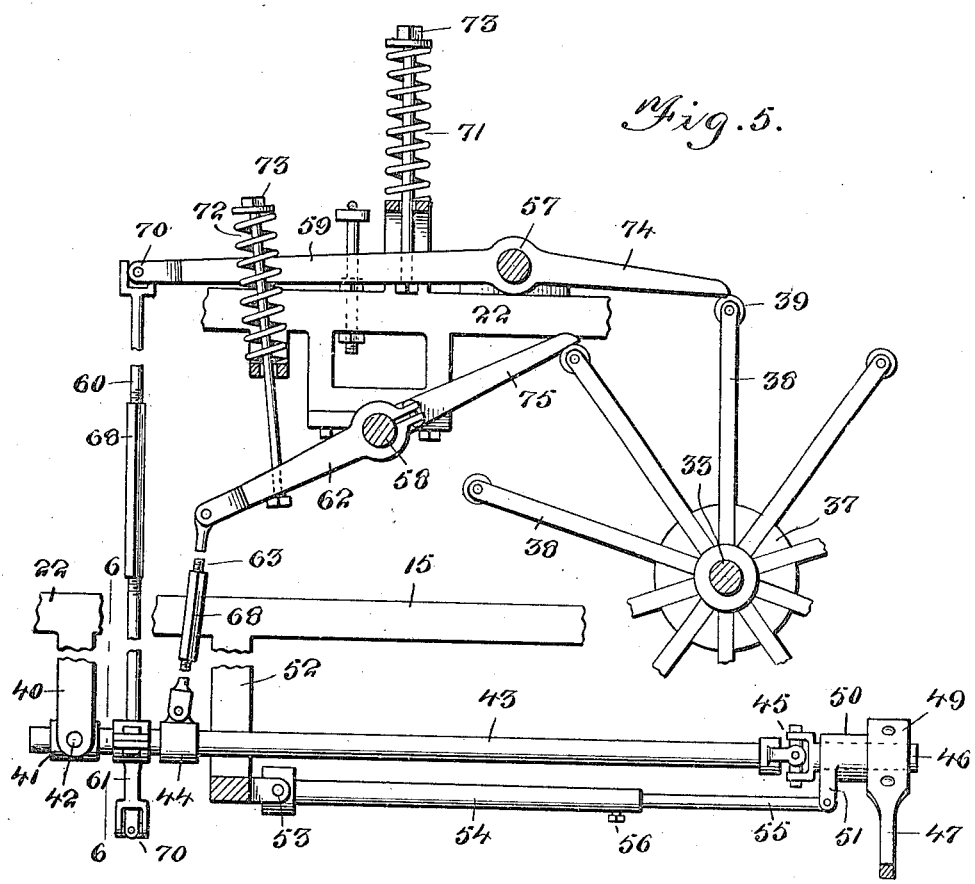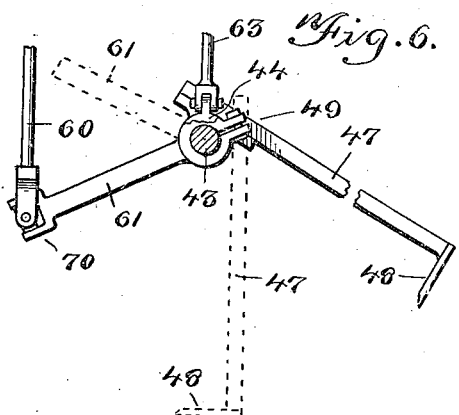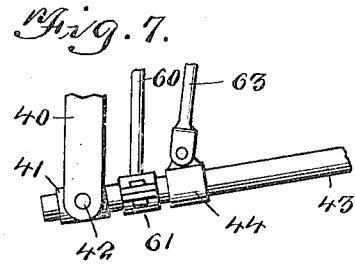

UNITED STATES PATENT OFFICE.

JASPER N. DANIEL, OF ENNIS, TEXAS, ASSIGNOR OF ONE-HALF TO GURINE ORVIG AND GUSTAVE W. ORVIG.

COTTON-CHOPPER.

1,231,502.  Specification of Letters Patent.  Patented June 26, 1917.

Application filed January 12, 1917. Serial No. 142,100.

*To all whom it may concern:*

Be it known that I, JASPER N. DANIEL, a citizen of the United States, residing at Ennis, in the county of Ellis and State of Texas, have invented new and useful Improvements in Cotton-Choppers, of which the following is a specification.

This invention relates to cotton choppers, and it has for its object to produce a machine of this class of simple and improved construction whereby plants may be chopped out at the requisite intervals.

A further object of the invention is to produce a machine of the class described wherein suitable and improved provision is made for the adjustment and operation of the cutting and chopping tool.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,

Fig. 2 is a top plan view of the same.

Fig. 3 is a transverse sectional view taken on the line 3—3 in Fig. 1.

Fig. 4 is a transverse sectional view taken on the line 4—4 in Fig. 1.

Fig. 5 is a sectional view drawn to a larger scale and taken on the line 5—5 in Fig. 2.

Fig. 6 is a sectional detail view taken on the line 6—6 in Fig. 5.

Fig. 7 is a detail view in side elevation showing a portion of the chopper carrying shaft in a tilted position.

Corresponding parts in the several figures are denoted by like characters of reference.

Figure 1:
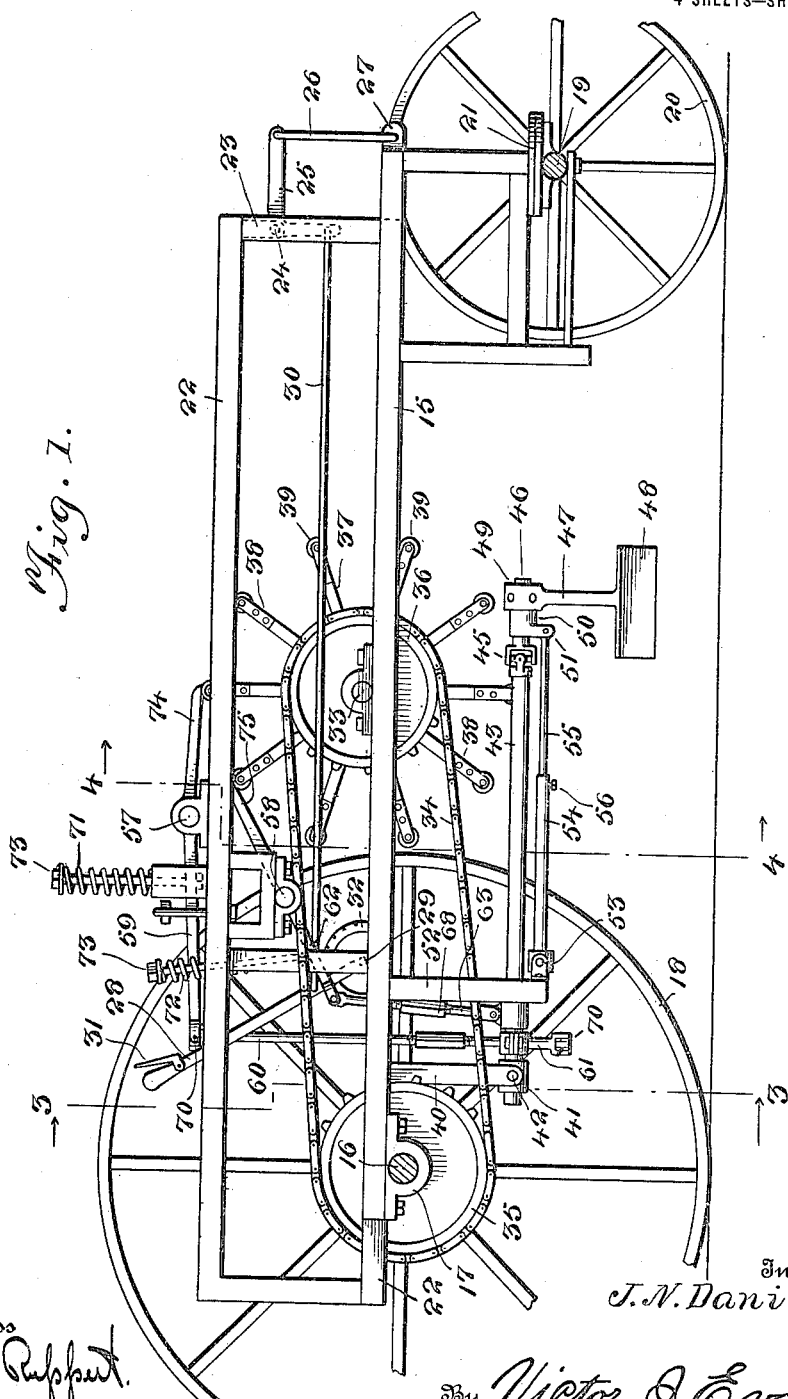
Figure 1 is a view in side elevation of a machine constructed in accordance with the invention.

The main frame 15 of the improved machine is supported near its rearward end on the rear axle 16 which is supported for rotation in bearings 17 and which carries the ground wheels 18 from which motion may be transmitted to the moving parts of the machine, it being understood that well known means, such as clutches, for interrupting motion and the like may be used wherever required, although not particularly illustrated. The forward end of the main frame is supported on the front axle 19 having ground wheels 20; a fifth wheel 21 is provided to enable the machine to be steered.

Supported pivotally on the rear axle 16 is a movable auxiliary frame 22. Said frame, which is a skeleton structure, includes vertical front members 23 supporting a shaft 24 carrying a bell crank 25 having a forwardly and a downwardly extending arm. The forwardly extending arm of the bell crank is connected by a link 26 with a lug or bracket 27 on the main frame. 28 is a hand lever fulcrumed at 29 on the main frame, said lever being connected by a rod 30 with the downwardly extending arm of the bell crank 25. It will be seen that by manipulating the lever the bell crank may be rocked, thereby swinging the forward free end of the auxiliary frame in an arc having for its center the axis of the rear axle. To retain the parts in adjusted position the lever 28 is equipped with a stop member 31 engaging a segment rack 32.

The auxiliary frame 22 supports a transverse shaft 33 which receives motion from the axle 16 by means of a chain 34 trained over sprocket wheels 35, 36 which are fixed on the axle 15 and the shaft 33, respectively. The shaft 33 also carries a tappet wheel 37 having radially extending equidistantly disposed arms or tappets 38, each of which has been shown as carrying at the end thereof an anti-friction element, such as a roller 39. The tappet wheel 37 is fixed upon and rotates with the shaft 33, the speed thereof being governed by the relative sizes of the sprocket wheels 35 and 36.

The movable auxiliary frame is provided with a bracket 40 supporting a sleeve 41 which is tiltably mounted on pivots or trunnions 42. The sleeve 41 affords a bearing for the rearward end of a longitudinally disposed shaft 43 which is revoluble and slidable in the said bearing sleeve. Connected with the forward end of the shaft 43 by means of a universal joint 45 is a stub shaft 46 on which is fixed a radial arm 47 carrying the hoe blade 48. The arm 47 has a hub 49 on which abuts a sleeve 50 having a downwardly extending lug 51. The main frame has a bracket member 52 with which is pivotally connected at 53 a tube 54 in which telescopes a rod 55, the forward end of which is pivotally connected with the lug 51 of the sleeve 50. A set screw 56 is provided whereby the extension rod 55 may be fixed in adjusted position in the tube 54.

The auxiliary frame 22 is provided with bearings wherein rock shafts 57 and 58 are supported, the rock shaft 57 being supported in advance of the rock shaft 58. The rock shaft 57 has an arm 59 that is connected by a pitman 60 with a crank 61 that extends radially from the shaft 41 on which the said crank is fixed in any convenient manner. The rock shaft 58 has a rearwardly extending arm 62 with which is pivotally connected the upper end of a connecting rod or pitman 63, said pitman carrying at its lower end a sleeve 44 which is pivotally connected therewith, said sleeve affording an additional bearing for the shaft 43 the rearward end of which is supported by the sleeve 41 hereinbefore described. In order that proper adjustment may be made each of the pitmen 60 and 63 is preferably composed of two parts connected together by a turn buckle 68. It is also desirable that connection be established between the pitman 60, the arm 59 and the crank 61 by means of universal joints of well known construction as best seen at 70 in Figs. 5 and 6. The arms 59 and 62 which extend rearwardly with respect to the rock shafts 57, 58 are normally forced upward by the action of springs 71, 72, the tension of each of which may be governed and adjusted by an adjusting nut 73. It will be seen that the purpose of the rocking arm 59 and the actuating spring 71 will be to impart a rocking movement in one direction to the shaft 43, said movement being effective to deliver the cutting stroke of the hoe. The purpose of the rocking arm 62, and spring 72 is to tilt the forward portion of the shaft 43 in an upward direction immediately following the delivery of the cutting stroke, thereby moving the hoe to a position where it will not interfere with the row of growing plants during the progressive movement of the machine and the return movement of the hoe to its initial or starting position.

The rock shaft 57 has an arm 74 that extends in the direction of the tappet wheel 37 to be engaged by the antifriction elements carried by the tappets 38 and the rock shaft 58 likewise has an arm 75 extending in the direction of the tappet wheel to be engaged by the tappets. The parts are so arranged and proportioned that the arm 75 will be engaged by a tappet directly to the rearward of that which engages the arm 74, and that the arm 74 will be released from its engaging tappet just before the arm 75 is so released, it being important that there shall be a sufficient interval of time for the spring 71 to function before the spring 72 commences its function. This arrangement will be clearly understood by reference to Fig. 5 of the drawings.

The adjustment of the pivoted auxiliary frame 22 about the axis of the rear axle 16 is provided in order that the free end of the hoe carrying shaft 43 may be raised or lowered so as to regulate the position of the hoe with respect to the ground or, in other words, to enable the hoe to cut to any requisite depth in the ground. When such adjustment is to be made, the set screw 56 is first loosened, thus permitting the rod 55 to telescope freely in the tube 54 while the adjustment is being made. When the desired adjustment has been effected, the rod 55 is adjusted properly in the tube 54, the purpose being to bring the stub shaft 46 on which the hoe carrying arm is secured to an approximately horizontal position, the universal joint 45 being provided in order that such adjustment may be made. The parts are then secured in the desired relative position by tightening the set screw 56.

In the operation of this device, when the machine, which may be drawn by animal or other power, advances over the ground motion will be transmitted from the ground wheels 18 to the shaft 33 carrying the tappet wheel. By the engagement of one of the tappets with the arm 74 the latter will be tilted against the tension of the spring 71 until it assumes the position shown in Fig. 5. At the same time the arm 75 will be tilted by one of the tappets until it assumes the position also shown in full lines in Fig. 5. The full lines of Fig. 6 show the parts in a position corresponding to that seen in Fig. 5, and as seen in Fig. 6, the hoe carrying arm 47 is now in a raised position ready to deliver a blow. As soon as the arm 74 is released from its engaging tappet, the spring 71 will function, thereby lifting the arm 59 and causing a rocking movement to be imparted to the shaft 43, whereby the hoe will be caused to deliver a blow, the hoe assuming the position shown in dotted lines in Fig. 6. At this precise moment one of the tappets 38 passes out of engagement with the arm 75 leaving the spring 72 free to function and by the action of said spring the arm 62 will be lifted causing the pitman 63 carrying the bearing sleeve 44 to lift or tilt the forward end of the shaft 43 with which the stub shaft carrying the hoe is connected in an upward direction to a sufficient extent to enable the hoe to clear the row of growing plants. This lifting movement causes the shaft 43 to swing about the axis of the pivots or trunnions 42 of the bearing sleeve 41, and this swinging movement of the shaft 43 is not resisted by the supporting members 50, 54, 55 because the shaft 43 is free to slide longitudinally in its bearings 41, 44. As the machine advances, the arm 74 of the shaft 57 will be engaged by one of the tappets to rock the shaft 57 against the tension of the spring 71, thereby restoring the hoe to its initial or starting position through the medium of the pitman 60 and the crank 61 of the shaft 43. At the same time one of the tappets engaging the arm 75 will rock the shaft 58 against the tension of the spring 72 thereby gradually lowering the forward end of the shaft 43 to its initial or starting position through the medium of the pitman 63 and the bearing sleeve 44.

It will be seen that by the device constructed as herein described, the machine may be adjusted so as to operate successfully on rows of plants under varying conditions. The tilting frame that carries the hoe and its actuating mechanism may be raised or lowered, causing the hoe to dig as deep or as shallow as may be required. Means are provided for maintaining the hoe in the proper position for best delivering the blow, and by adjusting the tension of the actuating springs the blow may be delivered with as little or as great force as may be desired in order to accomplish results in the most effective and satisfactory manner.

Having thus described the invention, what is claimed as new is:

1. In a cotton chopper, a wheel supported main frame having front and rear axles, an auxiliary frame pivoted on the rear axle, chopping mechanism and actuating means therefor carried by the auxiliary frame, supporting means for the chopping mechanism carried by the main frame, and means for supporting and adjusting the free end of the auxiliary frame.

2. In a cotton chopper, a wheel supported main frame having front and rear axles, an auxiliary frame pivoted on the rear axle, said auxiliary frame including vertical members, a rock shaft supported by said vertical members, a bell crank on the rock shaft, a link connecting one arm of the bell crank with the main frame, an adjusting lever fulcrumed on the main frame, and a link connecting the adjusting lever with the other arm of the bell crank.

3. In a cotton chopper, a longitudinally disposed rock shaft, bearing members for said rock shaft whereby it will be tiltably supported, a hoe carrying stub shaft universally jointed with the rock shaft, and means for supporting the stub shaft in the desired position with respect to the rock shaft in various positions of the latter.

4. In a cotton chopper, a longitudinally disposed rock shaft, bearing members for said rock shaft whereby it will be tiltably supported, a hoe carrying stub shaft universally jointed with the rock shaft, means for supporting the stub shaft in the desired position with respect to the rock shaft in various positions of the latter, said means including a bearing sleeve on the stub shaft, and means for securing said bearing sleeve at various adjustments longitudinally with respect to the rock shaft.

5. In a cotton chopper, a longitudinally disposed rock shaft, bearing members for said rock shaft whereby it will be tiltably supported, a hoe carrying stub shaft universally jointed with the rock shaft and means for supporting the stub shaft in the desired position with respect to the rock shaft in various positions of the latter, said means including a bearing sleeve on the stub shaft, a tiltably supported tube, a rod telescoping in the tube and connected pivotally with the bearing sleeve, and a set screw whereby the rod may be secured at various adjustments in the tube.

6. In a cotton chopper, a rock shaft, a tiltably supported bearing sleeve for the same, a hoe connected with and carried by the free end of the rock shaft, means for rocking the shaft slowly to move the hoe to a starting position, spring means for quickly rocking the shaft in the opposite direction to deliver a cutting stroke, and means for tilting the free end of the rock shaft upwardly immediately following the cutting stroke to elevate the hoe above the row of plants.

7. In a cotton chopper, a rock shaft, a tiltably supported bearing sleeve for the same, a hoe connected with and carried by the free end of the rock shaft, means for rocking the shaft slowly to move the hoe to a starting position, spring means for quickly rocking the shaft in the opposite direction to deliver a cutting stroke, and means for tilting the free end of the rock shaft upwardly immediately following the cutting stroke to elevate the hoe above the row of plants, and for gradually restoring the rock shaft to its initial position while it is being rocked to restore the hoe to its starting position.

8. In a cotton chopper, a wheel supported main frame having front and rear axles, an auxiliary frame pivoted on the rear axle, transverse rock shafts carried by the auxiliary frame, each rock shaft having a forwardly and a rearwardly extending arm, spring means for lifting the rearwardly extending arms of the rock shafts, tappet means engaging the forwardly extending arms of the rock shafts to rock the latter against the tension of the respective springs, a pivoted bearing sleeve carried by the auxiliary frame, a longitudinal hoe carrying rock shaft journaled in said sleeve, a crank on said rock shaft, a pitman connecting said crank with the spring actuated arm of one of the transverse rock shafts, an auxiliary bearing sleeve for the longitudinal hoe carrying rock shaft, and a pitman connecting said auxiliary bearing sleeve with the rearwardly extending spring actuated arm of the other transverse rock shaft.

9. In a cotton chopper, a wheel supported main frame having front and rear axles, an auxiliary frame pivoted on the rear axle, means for adjusting the auxiliary frame and for securing it at various adjustments, transverse rock shafts carried by the auxiliary frame each having a forwardly and a rearwardly extending arm, springs for lifting the rearwardly extending arms of the rock shafts, tappet means for lifting the forwardly extending arms of the rock shafts against the tension of the springs, a bearing sleeve pivotally supported by the auxiliary frame, a longitudinally disposed hoe carrying rock shaft journaled in said sleeve, auxiliary bearing means for the hoe carrying rock shaft connected with the rearwardly extending spring actuated arm of one of the transverse rock shafts, a crank arm extending radially from the hoe carrying rock shaft, a pitman connecting said crank arm with the rearwardly extending spring actuated arm of the other transverse rock shaft, and means connected with the main frame for sustaining the free end of the hoe carrying rock shaft in various adjusted positions.

10. In a cotton chopper, a wheel supported main frame having front and rear axles, an auxiliary frame pivoted on the rear axle, means for adjusting the auxiliary frame and for securing it at various adjustments, transverse rock shafts carried by the auxiliary frame each having a forwardly and a rearwardly extending arm, springs for lifting the rearwardly extending arms of the rock shafts, tappet means for lifting the forwardly extending arms of the rock shafts against the tension of the springs, a bearing sleeve pivotally supported by the auxiliary frame, a longitudinally disposed hoe carrying rock shaft journaled in said sleeve, auxiliary bearing means for the hoe carrying rock shaft connected with the rearwardly extending spring actuated arm of one of the transverse rock shafts, a crank arm extending radially from the hoe carrying rock shaft, a pitman connecting said crank arm with the rearwardly extending spring actuated arm of the other transverse rock shaft, and means connected with the main frame for sustaining the free end of the hoe carrying rock shaft in various adjusted positions; said hoe carrying rock shaft including a universal joint near the forward end thereof, and supporting means for the hoe carrying shaft including a pivotally supported tubular member, a rod telescoping therein, means for securing said rod in adjusted position, a bearing sleeve for that portion of the hoe carrying shaft beyond the universal joint, and a connection between said bearing sleeve and the telescoping rod.

In testimony whereof I affix my signature.

JASPER N. DANIEL.

Copies of this patent may be obtained for five cents each, by addressing the "Commissioner of Patents, Washington, D. C."